July 16, 1940.　　C. HAYES ET AL　　2,208,293
INTERNAL SHOE BRAKE
Filed Dec. 15, 1937　　6 Sheets-Sheet 1

Inventors
Cecil Hayes
Leslie C. Chouings
by
Atty.

Inventors
Cecil Hayes
Leslie C. Chouings

July 16, 1940.                C. HAYES ET AL                2,208,293
                           INTERNAL SHOE BRAKE
                        Filed Dec. 15, 1937        6 Sheets—Sheet 6

Inventors
Cecil Hayes,
Leslie C. Chouings
by
Atty.

Patented July 16, 1940

2,208,293

UNITED STATES PATENT OFFICE 2,208,293

INTERNAL SHOE BRAKE

Cecil Hayes and Leslie Cyril Chouings, London, England, assignors to Automotive Products Company Limited, London, England Application December 15, 1937, Serial No. 180,362
In Great Britain December 21, 1936

9 Claims. (Cl. 188—78)

This invention relates to internal shoe drum brakes of the form in which one or more rigid arcuate brake shoes—usually two in number—are provided on their peripheral portions with linings composed of frictional material and are anchored each at one end, the other end being moved outwards by actuating means so as to bring the lining into contact with the internal surface of the drum. In such brakes it is the usual practice to anchor each of the shoes by mounting it upon a simple pivot such as an anchor pin carried by a non-rotating part of the brake assembly, the applying movement of the shoe thus being an arcuate one about the axis of the anchor pin.

The braking force exerted by such a shoe of given size in response to a given applying force is dependent upon a number of factors, these being principally (1) the coefficient of friction between the lining and the drum (2) the angular span of the lining measured at the drum centre and its disposition, and (3) the distance of the anchor pin axis from the drum centre. Unfortunately, the extent to which the braking force can be increased by modifying any or all of these factors is seriously limited by a phenomenon which is known as toe grab or self-locking of the toe, and which causes locking of the shoe or else unsteady operation thereof.

It is the main object of the invention to provide an improved form of shoe mounting whereby the effects of toe-grab are overcome, said mounting consequently allowing the braking power of the shoes to be improved by increasing the span of the lining, or increasing the coefficient of friction between the lining and the drum or shifting the anchor pin nearer to the brake axis or by affecting a combination of these alterations.

This result is obtained by mounting the shoe so that its anchored end is free to move pivotally and also to slide towards and away from the drum, the present invention being characterised by the fact that the inclination of the sliding movement is such that the equivalent fulcrum of the shoe lies substantially on that drum diameter which is at right angles to the drum radius bisecting the span of the lining on the shoe. The equivalent fulcrum, which is hereinafter more fully explained, is the instantaneous centre of rotation due to the combined sliding and pivoting movement of the shoe. The span of the lining is that angle subtended at the drum centre by said lining.

It is already known to mount rigid arcuate brake shoes upon links so as to avoid toe-grab, and in other cases it has been proposed to mount the shoes so that they are free to pivot and also to slide towards and away from the drum. In these latter cases, however, the angle of sliding has been such that the distribution of lining pressure, and consequently the distribution of wear of the lining and also the braking power, are all seriously affected. For example, it has been proposed to mount a rigid arcuate shoe of the normal proportions by forming its heel end with a notch or slot lying in a truly radial direction, and it is found upon investigation that the toe end of the lining is entirely wasted when said lining has the usual value for the coefficient of friction, namely 0.3 or 0.4. In a further instance the angle of sliding is about 55°, and this is found to give no pressure at the heel for ordinary linings. On the other hand it has further been proposed to form the heel end of a rigid arcuate brake shoe with a sliding surface engaging a fixed anchor pin, the direction of said sliding surface being such that when produced it passes to that side of the drum axis nearest to the body of the shoe under consideration. This, of course, produces an entirely different braking effect due to the decided wedging action which occurs, and it is now wished to make it quite clear that in all brake shoes arranged in accordance with the invention, the inclination of sliding as hereinafter defined and mentioned as the angle α, is always in such a sense that when the sliding surface on the shoe is produced it passes to that side of the drum axis remote from the body of the shoe in question.

The invention accordingly provides in an internal drum brake having a plurality of shoes which when applied, operate independently of one another, a method of increasing the braking force and maintaining efficient lining wear, consisting in mounting the anchored end of a rigid arcuate brake shoe so that it is free to pivot, and also to slide in a direction towards and away from the brake drum, the inclination of such sliding movement as herein defined (angle α) being such that the equivalent fulcrum of the shoe lies substantially on that diameter which is at right angles to the drum radius bisecting the span of the lining. Preferably the inclination of sliding is such that the equivalent fulcrum lies substantially in register with the centre of the pivotal movement of the shoe, i. e., the instantaneous centre of pivotation.

The invention is illustrated in the accompanying drawings in which.

Figure 1:
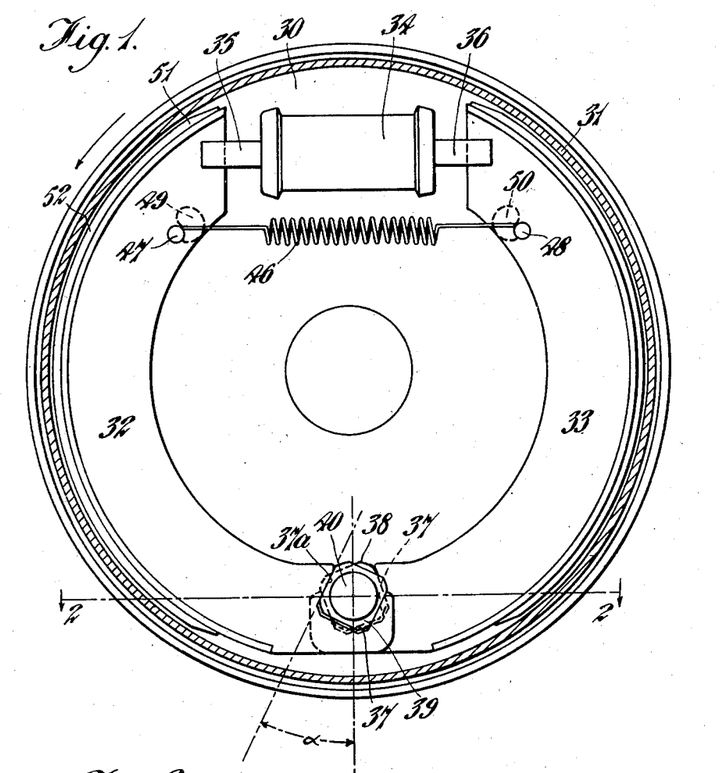
Figure 1 is a diagrammatic side elevation of an improved two-shoe brake assembly, the usual drum being shown in section.
Figure 2:
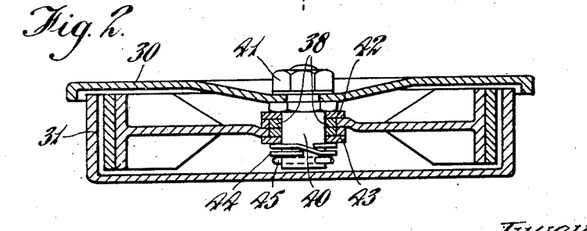
Figure 2 is a fragmentary sectional plan taken on the line 2—2 of Figure 1.

The brake assembly shown in Figures 1 and 2 comprises a back plate 30 which is non-rotatably mounted upon the vehicle or other machine with which the brake is to work, said plate serving to close the mouth of a cylindrical brake drum 31. The back plate 30 also carries a pair of rigid arcuate brake shoes indicated at 32 and 33, the upper free ends of which are arranged to be spread apart by a suitable actuating means, such as a double-ended hydraulic wheel cylinder unit 34, having a pair of push rods 35 and 36 engaging with the brake shoes 32 and 33. This operates as a "floating" actuating device and ensures that equal brake-applying forces are exerted upon the two brake shoes, irrespective of inequality of the lining wear.

Each of the shoes is of T-shaped cross-section as will be seen in Figure 2, and at its "heel" end the vertical limb or web is formed with a substantially U-shaped notch 37. Each notch accommodates slidably an intermediate member 38 which is generally of square or octagonal configuration or is formed from a circular piece of material having four flat surfaces mutually at right angles. The intermediate members have central bores 39 by which they are pivotally mounted upon an anchor pin 40 carried by the back plate 30. As will be seen in Figure 2 a nut 41 secures the anchor pin 40 to the back plate 30, while a pair of flat circular washers 42 and 43 serve to prevent displacement of the shoes in a direction longitudinally of the anchor pin 40. The lower ends of the shoes 32 and 33 are held in frictional engagement with one another by the action of a spring washer 44, which latter is held in a compressed condition by a split cotter pin 45 so as to prevent the shoes from rattling. The parts 43, 44 and 45 are omitted from Figure 1 so that the shape of the notches 37 and the intermediate members 38 can be clearly seen. The two shoes 32 and 33 are normally retracted by a coiled compression spring 46 which is looped at its ends upon pins 47 and 48 carried by the shoes 32 and 33 respectively. This retracting movement in the present example is adjusted by a pair of involute cam members 49 and 50 carried by the back plate 30. Obviously, of course, any other suitable adjusting device can be used for locating the brake shoes.

It will be seen that both of the shoes shown in Figure 1 are mounted upon the anchor pin 40 so that they are free to move angularly about the axis of the anchor pin in the manner of an ordinary pivoted shoe, but in addition to this movement each is permitted to slide in a direction towards and away from the drum. This direction is, of course, governed by the inclination of the notch 37 in the web of the brake shoe, and for convenience in explanation and in the calculations which follow, the obliquity of the sliding movement will be measured with regard to that particular brake drum radius which passes through the instantaneous centre of pivotation of the shoe assuming that no sliding is taking place. In the present instance this centre is, of course, the axis of the anchor pin 40, and the angle of sliding of the left hand shoe in this and the following examples is indicated by the angle α shown in the figures. Thus, the angle of obliquity of the notch 37 is measured from the edge 37a thereof nearest to the body of the brake shoe, and in all cases the inclination is in such a sense that the direction of the sliding surface 37a, when produced, passes to that side of the drum axis remote from the body of the particular shoe under consideration.

The main advantage of mounting the shoes so that their heel ends are capable of sliding outwardly towards the drum is that this freedom to slide greatly reduces the tendency of the shoe to grab at the "toe" end of the lining should this part of the lining be the first to engage the drum on account of the latter being to a certain extent out of true, for example by being slightly non-circular or eccentric. Radial vibration of the drum relative to the back plate owing to loose wheel bearings may also cause this effect. It may be mentioned here that this propensity of the leading shoe to chatter, or to lock upon the drum on account of toe grab is, to a large extent, the governing factor which limits the amount of servo action that can be satisfactorily utilised in designing the brake. In the usual form of pivoted brake shoe this phenomenon has the effect of restricting the distance by which the anchor pin can be moved towards the axis of the brake drum, and also the degree to which the lining at the toe end of the leading shoe can be extended, both of which alterations would, if permissible, have the effect of increasing the braking power of the shoe to a marked extent for any given applying force. By mounting the shoes, or at least that shoe which normally acts in leading sense, in such a manner that it is free to slide towards the drum, these improvements in the shoe design can be utilised without causing toe grab, but it is very important, if the maximum braking is to be obtained, that the angle of inclination at which sliding takes place should be appropriately selected. As will be hereinafter rendered clear this angle depends upon several factors, but for a brake shoe of the usual proportions having a fairly symmetrically disposed lining, the coefficient of friction of which is approximately 0.3 to 0.4, a sliding angle of 20° to 35° will be suitable, the usual value being approximately 27° or 28°.

When a shoe is mounted pivotally and slidably as described, its movements under the action of the applying means can be divided into three distinct forms. These are:—

(1) The initial movement which takes up the normal shoe clearance and which is a pivotal one about a fixed or moving centre, this being herein termed the instantaneous centre of pivotation;

(2) The movement of the shoe due to wear of the lining. This is a combined sliding and pivotal one depending upon the design of the brake shoe, the resultant movement taking place about a centre which is herein termed the equivalent fulcrum. If sliding actually takes place as part of this movement, the equivalent fulcrum lies at a point which is displaced from the instantaneous centre of pivotation; and (3) The movement of the shoe on account of eccentricity or other irregularity of the drum, this being principally a sliding movement.

Assume that the brake drum 31 in Figure 1 is rotating in an anti-clockwise direction and that hydraulic pressure is applied to the wheel cylinder unit 34, to apply the shoes 32 and 33 to the drum. If the toe end 51 of the leading shoe 32 should happen to touch the drum 31 before any other part of that shoe, the rotation of the drum causes the whole shoe 32 to slide downwards bodily until such time as the lining, indicated at 52, coacts with the drum over substantially the whole area of said lining. Thereafter the shoe can slide upon the intermediate member 38 if this movement is required to enable the shoe to accommodate itself to the drum, but any further applying movement is principally an angular one about the axis of the anchor pin 40. It will thus be seen that the most important edge of the notch 37 in each shoe is that one which lies nearest to the shoe itself, and which is indicated at 37a in the drawings. It is desirable, of course, that both of the shoes 32 and 33 should be slidably mounted in a similar manner so that the brake is enabled to operate efficiently for drum rotation in either direction.

Figure 3:
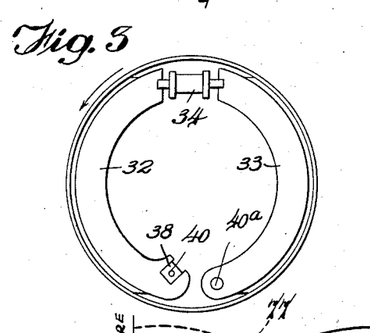
Figures 3 and 4 are diagrams on a reduced scale showing a modified shoe arrangement.
Figure 4:
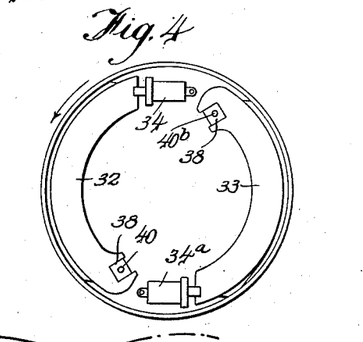

In Figure 3 the leading shoe 32 is pivotally and slidably mounted as before upon an anchor pin 40 with an intermediate member 38, but the trailing shoe 33 is pivoted in the conventional manner upon a second anchor pin, indicated at 40a. Moreover, the shoe 33 is reversed in the arrangement shown in Figure 4 and is provided with an intermediate member 38 and an anchor pin 40b disposed adjacent the hydraulic cylinder 34 which operates only the brake shoe 32. For applying the shoe 33, a separate hydraulic cylinder 34a is provided, both cylinders being fed in common so that when the brake drum is rotating in the normal direction indicated by the arrow, both shoes 32 and 33 act as leading shoes. The pull-off springs and shoe stops are omitted from Figure 4 which is merely diagrammatic.

Figure 5:
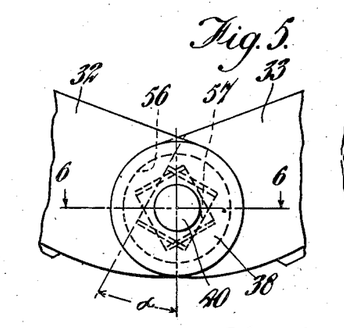
Figure 5 is a fragmentary side elevation showing a modified method of mounting the shoe ends.
Figure 6:
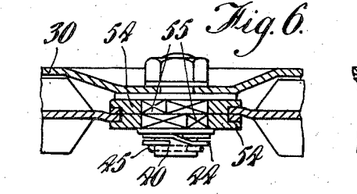
Figure 6 is a sectional plan on the line 6—6 of Figure 5.

In the arrangement shown in Figures 5 and 6 a single anchor pin 40 is provided, and this is shaped with a pair of collars 55 which are square in cross-section and which are disposed in the appropriate relationship to give the correct inclination of sliding as indicated by the angle $\alpha$ in Figure 5. The heel end of each of the two shoes 32 and 33 is in this instance formed with a relatively large circular hole indicated at 56, and this is occupied by a corresponding intermediate member 38 having a rectangular slot 57 at its centre, so that said intermediate member 38 is slidably mounted upon the appropriate square collar 55. In order to retain the shoes in place, each of the intermediate members is provided with a flange 54, and said members are maintained in position upon the anchor pin 40 by a spring washer 44 and a cotter pin 45. Thus, angular movement of each shoe takes place by the shoe rotating upon the intermediate member, while the necessary sliding movement towards and away from the drum is rendered possible by the slot 57 in the intermediate member 38 which moves rectilinearly upon the anchor pin 40.

Figures 7, 8, 11, 12, 13:
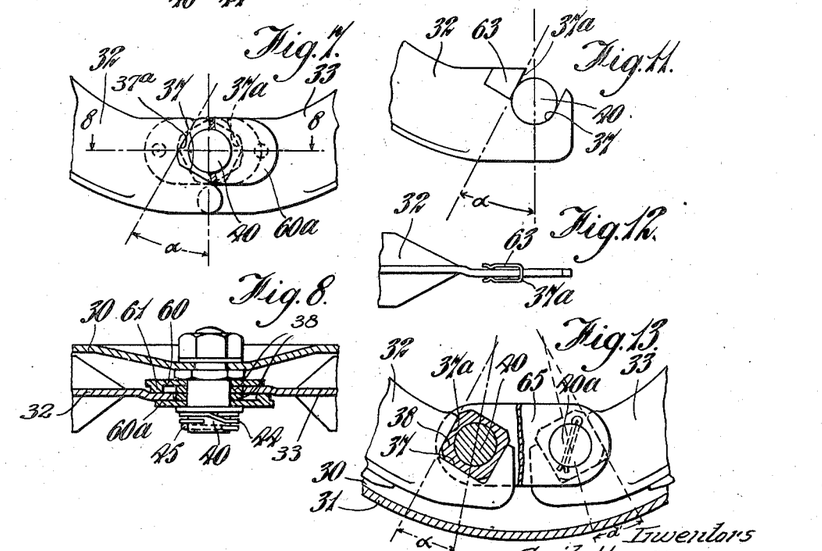
Figure 7 is another fragmentary side elevation to show another method of mounting the shoes.
Figure 8 is a sectional plan on the line 8—8 of Figure 7.
Figures 11 and 12 are fragmentary side elevation and plan respectively showing a modified shoe construction suitable for the arrangement in Figure 9.
Figure 13 is a fragmentary side elevation illustrating the use of separate anchor pins in a two-shoe brake assembly.

Each of the shoe ends shown in Figures 7 and 8 has an individual intermediate member 38 and is formed with a notch 37 of V-shape, one side only of said notch constituting a surface 37a inclined at the appropriate angle $\alpha$ for sliding engagement with an intermediate member 38. An oval washer 60 is threaded over the anchor pin 40 and serves as a support for the V-shaped end of the shoe 33, said washer being formed with a projection 61 which is equal in thickness to the web of the shoe 33 so as to support the other shoe 32. When both shoes have been placed in position, a similar washer 60a is passed over the anchor pin and the whole assembly is held firmly together in an axial direction by a spring washer 44 and a cotter pin 45 or other suitable fastening device.

Figure 9:
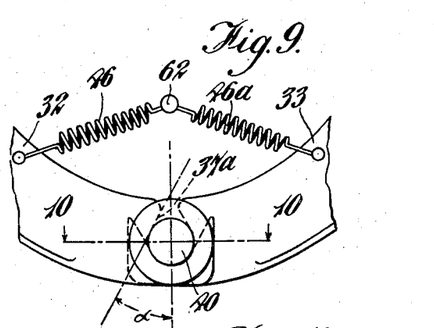
Figure 9 is a fragmentary side elevation of an alternative arrangement in which the shoe ends are pivotally and slidably mounted upon a non-rotatable anchorage.
Figure 10:
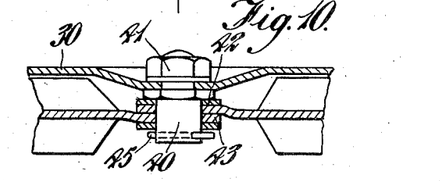
Figure 10 is a section on the line 10—10 of Figure 9.

Figures 9 and 10 show a modified arrangement which resembles that shown in Figures 1 and 2, with the exception that the intermediate members are omitted and the two shoes 32 and 33 slide and pivot directly upon the anchor pin 40. The action is therefore substantially the same as before, and it will be noted that the angle of inclination of the sliding surface 37a is again measured with regard to that drum radius which passes through the axis of the anchor pin 40, since this axis constitutes the instantaneous centre of pivotation about which the shoe pivots during the application of the brake, assuming no sliding is taking place. Two springs 46 and 46a serve to assist in the retraction of the shoes, these being each connected to a pin 62 carried by the back plate 30, so as to keep the ends of the notches 37 in contact with the anchor pin 40 when the brake is released. If the springs 46, 46a were omitted and the surface 37a allowed to roll freely upon the anchor pin 40, the instantaneous centre of pivotation would then be the position of rolling contact between the surface 37a and the anchor pin 40. Since the coacting surfaces of the anchor pin 40 and the notch 37 constitute a bearing area of very small width it is important in this construction that the parts should be adequately hardened to avoid wear and indentation, and if desired the method of construction shown in Figures 11 and 12 may be adopted. The anchor pin 40 is hardened and a hard steel wear plate 63 having a U-shaped cross section is fastened over the edge of the notch 37 so as to provide a hardened surface 37a.

The lower part of another two-shoe brake assembly is shown in Figure 13, and in this example of the invention two separate anchor pins 40 and 40a are used for carrying the shoes 32 and 33 respectively. Each anchor pin 40, 40a carries pivotally an intermediate member 38 which is slidably mounted within a corresponding notch 37 formed in each shoe. A plate 65, which is shown partly broken away, bridges the two anchor pins 40 and 40a to brace the latter and to keep the intermediate members and the shoes 32, 33 in position.

Figure 14:
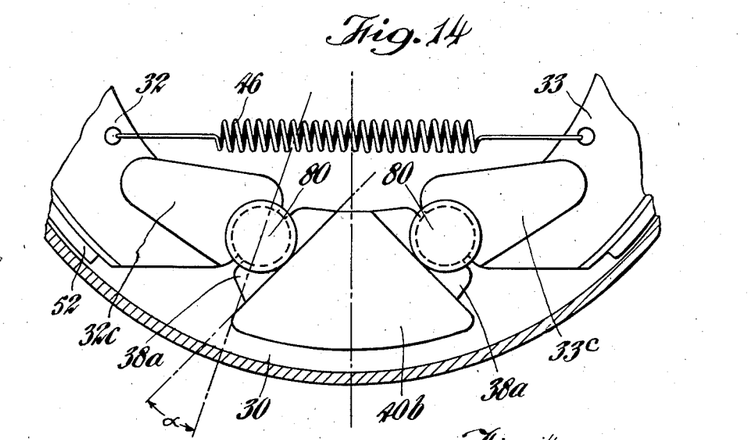
Figure 14 is a fragmentary side elevation of a modified form of brake shoe anchorage.

A reversed arrangement of the shoe anchorage is shown diagrammatically in Figure 14, in which each of the shoes 32 and 33 has its end portion 32c, 33c in pivotal connection with a corresponding slipper block 38a by means of a flanged pin 80. The slipper blocks 38a each act in the manner of an intermediate member by sliding upon a wedge-shaped abutment 40b. Thus each shoe is mounted for separate pivotal and sliding movement, and the angle of sliding is measured relative to the respective drum radius passing through the axis of the shoe pivot 80, as indicated at $\alpha$. If desired, the brake shoe clearance can be regulated by adjusting the position of the abutment 40b in a radial direction.

Figure 15:
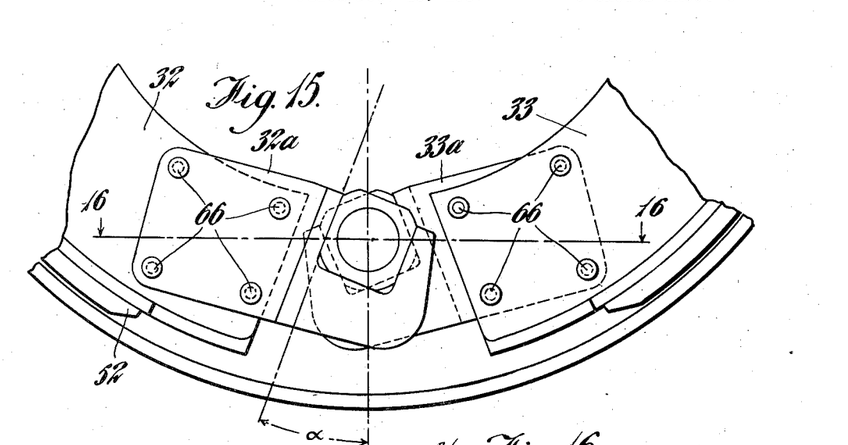
Figure 15 is a fragmentary side elevation showing one method of constructing the anchored ends of the shoes.
Figure 16:
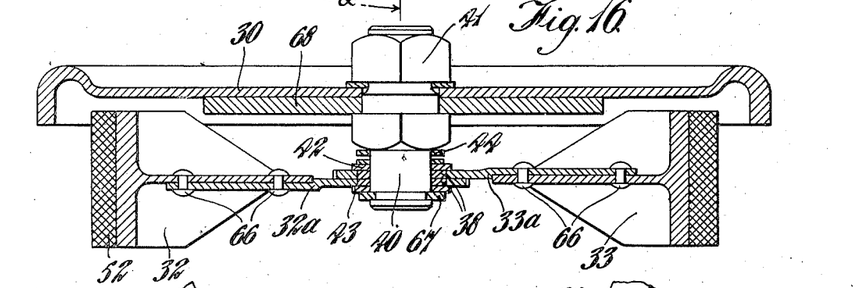
Figure 16 is a sectional plan on the line 16—16 of Figure 15.
Figure 17:
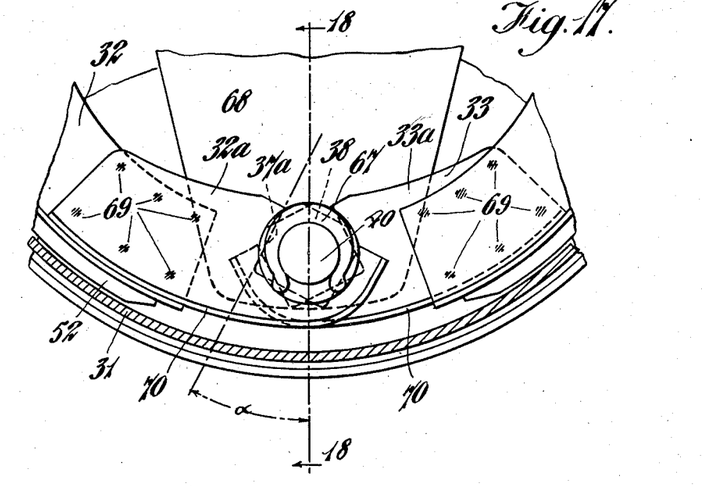
Figure 17 is a fragmentary side elevation of another pair of shoe ends.
Figures 18, 22:
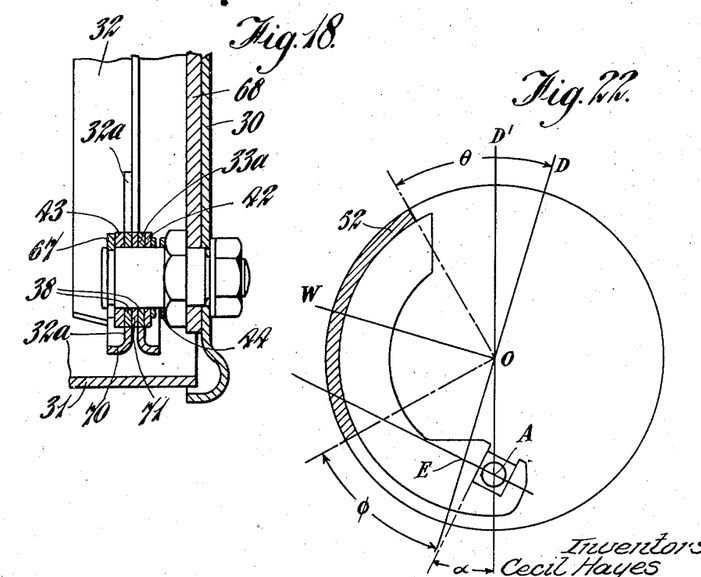
Figure 18 is a front sectional view taken on the line 18—18 of Figure 17.
Figures 21 and 22 are similar diagrams relating to the improved floating form of leading shoe.
Figure 19:
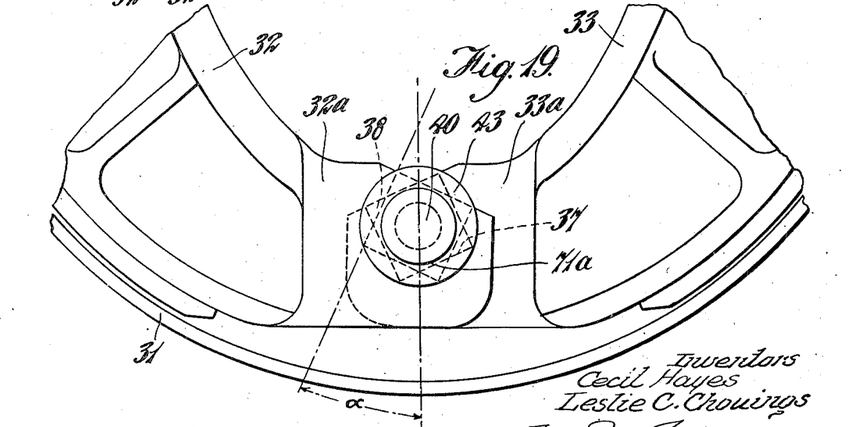
Figure 19 is another fragmentary side elevation showing a method of constructing the anchor ends of a pair of arcuate brake shoes composed of cast metal.

Figures 15 to 19 are intended to illustrate some constructional forms of brake shoe mounting according to the invention, these being all based upon the arrangement shown diagrammatically in Figures 1 and 2. A comparison will therefore make the details clear. In Figures 15 and 16 the shoes 32 and 33 are formed from the usual rolled T-section steel, and in order to facilitate the manufacture of the notched portions of the shoes, end lugs 32a and 33a are secured to the respective webs of the shoes 32 and 33, by means of rivets indicated at 66, said end lugs 32a, 33a being fitted upon the anchor pin 40 in the manner previously described. In place of the cotter pin 45 in Figure 1, however, a spring ring 67 engages a groove in the anchor pin. During assembly the spring washer 44 is placed upon the anchor pin before the shoes, and that part of the back plate 30 adjacent the anchor pin 40 is strengthened by means of an elongated washer 68. The same general construction is embodied in Figures 17 and 18, but in this case the end lugs 32a and 33a are spot-welded to the shoes 32, 33 as indicated at 69; and moreover are formed along their outer edges with flanges 70 for strengthening purposes. The end lugs are straight in this construction and a washer 71 is interposed, therefore, between the intermediate members 38 so as to compensate for the thickness of the webs of the shoes 32 and 33. The strengthening washer 68 takes the form of a fairly extensive plate, as the shoe anchorage is intended to resist a large braking force. Where cast aluminium or other cast metal brake shoes are employed the construction shown in Figure 19 is preferably used. In this case the end lugs 32a and 33a are composed of sheet steel or other relatively hard sheet metal, and are inserted into the moulds when the shoes are being cast so that said end lugs become partly embedded in the casting. A head 71a on the anchor pin 40 holds the washer 43, the shoes 32, 33 and the intermediate members 38 in position, said anchor pin being passed through the intermediate members 38 before being inserted into its hole in the back plate and locked by the usual nut corresponding to the nut 41 in Figure 1.

The foregoing description of the invention will now be augmented by a theoretical consideration of the conditions which are thought to occur, and which account for the action of the improved form of brake shoe mounting.

Figure 20:
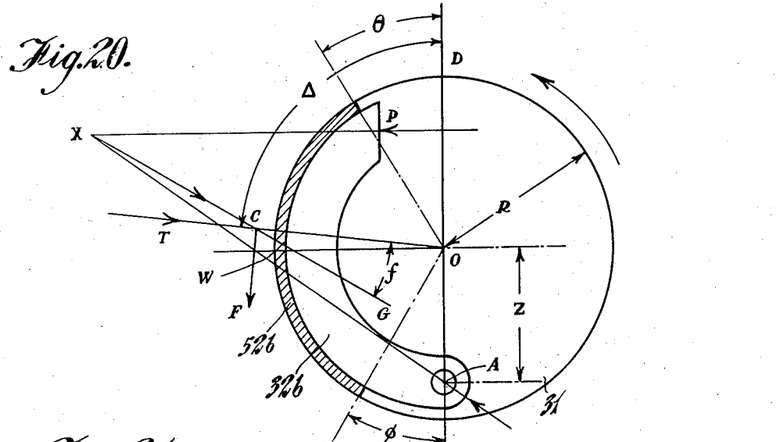
Figure 20 is a diagram illustrating the calculations and graphical determinations in connection with a leading shoe which is pivotally mounted in the well-known manner.

It is relevant to mention first, the conditions which exist in a simple non-sliding pivoted shoe of the ordinary kind such as that indicated diagrammatically in Figure 20, since this will make the subsequent calculations simpler to follow. In this diagram, A indicates the axis of the anchor pin of a pivoted shoe 32b having a friction lining 52b, and P the point of action of the usual applying force. When the drum 31 is rotating in the anti-clockwise direction as shown, the shoe 32b acts in a leading sense. Assuming conditions during braking to be steady at any given moment, the shoe is in equilibrium, and is acted upon by three forces, namely (1) the applying force at P, (2) an anchor reaction at A and (3) the resultant drum reaction acting along a line indicated at XC. These three forces met in a common point X since the shoe is in equilibrium.

The resultant drum reaction can conveniently be resolved into two components, these being firstly a resultant radial force T due to the pressure of the drum on the shoe, and secondly a resultant friction force F acting at right angles to the radial force T. It is well known that the ratio F/T is equal to the coefficient of friction between the lining 52b and the drum, and therefore the angle $f$ between the direction of the resultant radial force T and the direction XC of the resultant drum reaction has a "tangent" value which is equal to the coefficient of friction. The point of intersection of the forces T and F is indicated at C and is known as the "centre of pressure" of the lining. As shown in Figure 20 a diameter AD passing through the fulcrum of the shoe is drawn and serves as the datum for measuring the angular position of the "toe" end of the lining, given by $\theta$, and also the corresponding measurement of the "heel," given by $\phi$. The angular position of the centre of pressure C° is given by $\Delta$, while R is the internal radius of the brake drum, and Z is the distance from the axis of the anchor pin A to the axis of the brake drum.

For the purposes of the present invention it is desirable to know how the directions of AX and XC are obtained, and for this purpose two main formulae are used. These are:

(I)
$$\Delta = \frac{\sin \phi - \sin \theta + \theta \cos \theta + (\pi - \phi) \cos \phi}{\cos \phi + \cos \theta}$$

and (II) Distance from C to the drum centre =
$$\frac{R.M. + Z.N.}{L} \sin \Delta - Z \cos \Delta$$

where:

$L = \frac{1}{2}(\pi - \phi - \theta) + \frac{1}{4}(\sin 2\theta + \sin 2\phi)$
$M = \cos \theta + \cos \phi$
$N = \frac{1}{4}(\cos 2\theta - \cos 2\phi)$ The angles are of course measured in radians.

These formulae thus serve to fix the centre of pressure C. The brake shoe force diagram can then be drawn, and the point C joined to the centre O of the brake drum. The angle $f$ as determined by the particular coefficient of friction of the lining is then set out by drawing the line CG as shown in Figure 20 and GC is produced to cut the line of action of the force P at X. The line XA is then drawn in and gives the direction of the anchor pin reaction AX. The actual forces can, if desired, be obtained by drawing out the triangle of forces and comparing the lengths of the sides in the usual manner, the force P being known. It should be noted that the pressure and consequently the amount of wear on the lining 52b of the shoe 32b varies for different points on the lining and is a maximum at substantially a point W where the radius WO lies at right angles to the diameter DA through the fulcrum of the shoe, and the pressure and wear decrease on either side of the point W according to a sine law. In order to get satisfactory wear distribution, therefore, it is desirable that the lining of each shoe should be symmetrically disposed with regard to that drum radius which lies at right angles to the drum diameter passing through the fulcrum axis of the shoe, i. e., the span of the lining should be bisected by said drum radius.

A non-floating shoe as shown in Figure 20, has only one degree (i. e., mode) of freedom, namely rotation about the axis of the anchor pin. No linear movement of the shoe as a whole is possible, and the fulcrum about which it rotates coincides with the axis of the anchor pin.

When, however, the shoe end is constructed in the manner described in connection with Figures 1 to 19 it has two degrees (i. e., modes) of freedom. It is both capable of rotation about the axis of the anchor pin, and it is also capable of a linear motion in a direction parallel to the side 37a of the notch 37 or the slot 57 (see Figure 5). Hence the shoe is capable of a rotational movement, and also of a translational movement. It is well known that such a combination of coplanar rotation and translation is equivalent to a rotation about some particular fixed point or fulcrum. Hence a floating shoe can be considered as being capable of rotational movement only, about a fulcrum which does not necessarily coincide with axis of the anchor pin, and in the present specification this fulcrum is termed the "equivalent fulcrum" of the shoe. It is, therefore, the point about which the shoe must be regarded as turning at the particular instant of time under consideration.

In other words the "equivalent fulcrum" is the instantaneous centre of the combined rotational and linear motions of the brake shoe. It must not be confused with the previously mentioned instantaneous centre of pivotation which concerns only the rotational motion of the shoe and which was required for the definition of the angle of sliding α.

The method which is conveniently used for determining the equivalent fulcrum of a floating shoe will now be described with reference to the diagram, Figure 21, and it will be seen that it is a slight modification of that previously explained for the usual pivoted non-floating form of shoe. The present method consists briefly in selecting an arbitrary point for the equivalent fulcrum, working through the formulae previously given so as to find the centre of pressure of the lining corresponding to the equivalent fulcrum selected, and then graphically plotting the drum reaction to see whether it satisfies the conditions necessary for the shoe to remain in equilibrium. If it does not do so, a different equivalent fulcrum is selected and the process repeated.

If the new centre of pressure is also unsuitable it will nevertheless provide a good indication of the correct position of the equivalent fulcrum.

Figure 21:
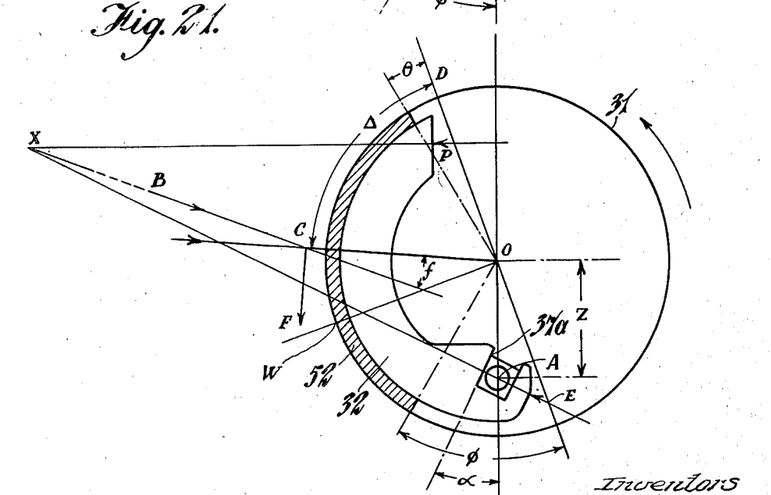

Thus, referring to Figure 21, the centre of the anchor pin is indicated at A and the sliding surface of the shoe 32 at 37a. The line of action of the applying force P can be drawn, and the reaction of the anchor pin is at right angles to the sliding surface 37a, (neglecting friction of the sliding motion) so that the line AX can be drawn to indicate this reaction. A point E on XA or XA produced is selected for the equivalent fulcrum and the drum diameter DE drawn in. The angles $\theta$ and $\phi$ relating to the arc of lining can then be measured, and from the formulae (I) and (II) previously given the position of the centre of pressure C is plotted and the line OC inserted. A line CB inclined to OC at the appropriate angle $f$ corresponding to the coefficient of friction between the lining material and the drum should pass through X if the equivalent fulcrum does lie at the selected point E. If not, then another point on the line XA or XA produced must be chosen, and the calculation repeated with the consequent new values of $\theta$ and $\phi$. When the position of the equivalent fulcrum has thus been found, the point of maximum wear in the lining is given by the outer end W of the radius WO disposed at right angles to that drum diameter DOE which passes through the equivalent fulcrum E.

It will be understood that Figures 20, 21 and 22 are not drawn accurately to scale but merely illustrate the method described. With a lining disposed as shown in Figure 21, the equivalent fulcrum when arranged in accordance with the invention should lie substantially in register with the anchor pin. It will further be appreciated that where the radius WO (Figure 22) which bisects the span of the lining 52 does not lie at right angles to the diameter D'OA passing through the instantaneous centre of pivotation (the anchor pin), the conditions for symmetrical lining wear are met by arranging the angle α so that the equivalent fulcrum E lies on that drum diameter DOE which does lie at right angles to the radius WO.

The principal aim of the designer of a drum brake is to obtain an arrangement in which the brake torque produced by the shoes is a maximum, consistent with smooth operation and a uniform distribution of lining wear. By mounting the shoes so that they are free to slide towards the drum at their "heel" ends it is possible to increase the braking force exerted by the shoe in either one or both of two ways. The first is to move the axis of the anchor pin A nearer to the drum centre, i. e., decrease the ration Z/R. The second is to increase the arc of lining, i. e., decrease $\theta$ and $\phi$. For a brake shoe which is pivoted as in Figure 20 such changes cannot satisfactorily be made to the extent desired as both have the effect of accentuating toe-grab. This takes place when the "toe" end of the lining is the first part to contact with the drum as previously mentioned. By mounting the shoe so that its heel end is free to slide outwards towards the drum this toe-grabbing is prevented and the shoe is enabled to accommodate itself to the drum. It must be borne in mind however that this freedom to slide may cause the position of the effective fulcrum (i. e. the equivalent fulcrum) of the shoe to be displaced in such a way that the distribution of lining wear is seriously affected, and it is therefore an object of the invention to arrange the angle of inclination α of the sliding surface so that the shoe shall have a smooth progressive action with freedom from toe-grab, a powerful braking action, and a substantially symmetrical distribution of lining wear. It is found that these conditions are met when the equivalent fulcrum lies substantially upon the drum diameter which is disposed at right angles to that drum radius bisecting the angular span of the lining. Thus, when the usual design of brake shoe as normally used in a two-shoe brake is slidingly mounted at its heel, the equivalent fulcrum can advantageously be arranged to lie substantially in register with the anchor pin. For bringing the equivalent fulcrum to this position the angle α usually has a value between 20° and 35°, and for a relatively large range of shoes the angle α is found to be 27° or 28°. A further advantage of arranging for the equivalent fulcrum to lie in register with the anchor pin, is that wear of the relatively sliding surfaces of the notch 37 and the intermediate member 38 is reduced, since the only sliding movement which takes place during the application of the brake is that due to "non-concentricity" of the drum. It is to be observed that the angular movement of the shoe within the drum causes the measurement of the angle α to vary slightly, but this effect can be disregarded, because the usual range of angular movement of a brake shoe is extremely small and the maximum movement during the life of the lining (i. e., movement from a 'fully off" position when the lining is new, to a 'fully on" position when the lining is worn out) rarely exceeds 3°, and is usually less than 2°. Thus the maximum consequent change in the position of the equivalent fulcrum due to the pivoting of the shoe is very small.

Figure 23:
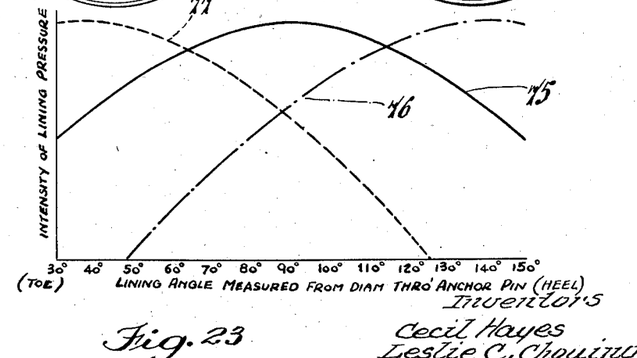
Figure 23 is a graph to illustrate the effect of altering the angle of sliding of the leading shoe.

The effect of taking a leading shoe of the general shape shown in Figure 21, and varying the inclination of the sliding surface 37a is shown in Figure 23. All the curves relate to a shoe having a lining which begins at its toe end 30° from that drum diameter passing through the anchor pin, and which terminates at a point 30° from the other end of the same diameter, the angle subtended at the centre of the drum being 120°. It will be seen from the curve 75 that when the angle α is calculated to bring the equivalent fulcrum substantially in register with the anchor pin, the pressure, and consequently the wear are symmetrically disposed and the lining is used to very good advantage. On the other hand the curve 76 shows the effect produced by the same brake lining when the value of α is zero., i. e., when the sliding surface is made parallel with the radius passing through the axis of the anchor pin, while the curve 77 shows the result of making α equal to 50°. It will be noted that the areas between the respective curves and the horizontal axis represent the relative amounts of braking effected by the shoe when the maximum intensities of lining pressure are made equal in each case. It thus follows that it is decidedly advantageous to arrange the inclination of the sliding surface 37a at such value that the lining wear is symmetrical, as the area beneath the curve 75 is much larger than that beneath either of the curves 76 and 77. In addition, the curves 76 and 77 show that part of the lining is entirely wasted since there is zero pressure and wear at the toe end of the lining represented by the curve 76, and also at the heel end of the lining denoted by the curve 77.

If desired, the sliding angle of the trailing shoe where this is mounted according to the invention, can be made different from that of the leading shoe in order that it may better suit the requirements of the trailing shoe. Thus the angle of inclination α' for the trailing shoe 33 as indicated in Figure 13 may be less than the angle α of the leading shoe 32, with a view to bringing the equivalent fulcrum of said trailing shoe as near as possible to its anchor pin.

Various constructions of rigid arcuate brake shoes other than those described may be slidingly and pivotally mounted to produce the effects herein explained, and modifications may be made therein. Any alternative actuating means, such as mechanical, electrical or pneumatic may be used for moving the shoes into contact with the drum.

What we claim is:

1. In a vehicle brake having a rotating drum, a back plate, a pair of rigid arcuate shoes carried by the back plate and actuating means for applying each of said shoes to the drum, the provision of anchorage means for one of the brake shoes comprising a slot formed obliquely in said shoe at its "heel" end, the angle of inclination of that side of the slot adjacent the body of the shoe being such that when continued it passes to that side of the drum centre remote from the said shoe, an anchor pin carried by the back plate and an intermediate member which is pivotally fitted over the anchor pin and has on its exterior two mutually parallel surfaces which fit slidably in the slot to permit the shoe to move toward and away from the drum for the purpose of preventing toe grab.

2. In a vehicle brake having a rotatable drum, a back plate, a pair of rigid arcuate shoes carried by the back plate and actuating means for applying each of said shoes to the drum, the provision of anchorage means for each of said shoes, the anchorage means comprising a slot formed obliquely in said shoe at its "heel" end, the angle of inclination of that side of the slot adjacent the body of the shoe being such that when continued it passes to that side of the drum centre remote from the said shoe, an anchor pin carried by the back plate and an intermediate member which is pivotally fitted over the anchor pin and has on its exterior two mutually parallel surfaces which fit slidably in the slot to permit the shoe to move toward and away from the drum for the purpose of preventing toe grab.

3. In a vehicle brake having a rotatable drum, a back plate, a pair of rigid arcuate shoes carried by the back plate and actuating means for applying each of said shoes to the drum, the provision of anchorage means for one of the brake shoes comprising a slot formed in the web of said shoe with an open end part directed inwardly and having mutually parallel walls which are disposed obliquely so that the wall nearest to the body of the shoe, when produced, extends to that side of the drum centre remote from the shoe, an anchor pin carried by the back plate and an intermediate member which is pivotally fitted over the anchor pin and has on its exterior two mutually parallel surfaces which fit slidably in the slot to permit the shoe to move toward and away from the drum for the purpose of preventing toe grab.

4. In a vehicle brake having a rotating arm, a back plate, a pair of rigid arcuate shoes carried by the back plate and actuating means for applying each of said shoes to the drum, the provision of anchorage means for one of the brake shoes comprising a slot formed obliquely in said shoe at its "heel" end, the angle of inclination of that side of the slot adjacent the body of the shoe being such that when continued it passes to that side of the drum centre remote from the said shoe, an anchor pin carried by the back plate and an intermediate member which is pivotally fitted over the anchor pin and has on its exterior two mutually parallel surfaces which fit slidably in the slot to permit the shoe to move toward and away from the drum, the arrangement being such that the angle between the said side of the slot and the drum radius passing through the centre of the anchor pin has a value between 20° and 35°.

5. A vehicle brake comprising in combination a drum, a back plate, an anchor pin on said back plate, a block pivotally mounted on the anchor pin, and a rigid arcuate brake shoe having a web portion formed at its "heel" end with an oblique slot which fits slidably upon the block and which has straight mutually parallel sides so inclined that the side adjacent the body of the shoe, when produced, passes to the side of the drum centre remote from the said shoe.

6. In a rotating drum vehicle brake a mounting for a rigid arcuate brake shoe comprising a fixed anchor pin, a block freely rotatable thereon, an oblique slot formed in the brake shoe and fitted slidably upon the intermediate block, that side of the slot adjacent the body of the shoe being arranged so that when produced it passes to the side of the drum centre remote from the shoe, and being inclined at an angle of between 20° and 35° with respect to the drum radius passing through the anchor pin.

7. In a rotating drum vehicle brake a mounting for a rigid arcuate brake shoe comprising a fixed anchor pin, a block freely rotatable thereon, an oblique slot formed in the brake shoe and fitted slidably upon the intermediate block, that side of the slot adjacent the body of the shoe being arranged so that when produced it passes to the side of the drum centre remote from the shoe, and being inclined at an angle of between 20° and 35° with respect to the drum radius passing through the anchor pin, so that the equivalent fulcrum of the shoe is disposed substantially in register with the axis of the anchor pin.

8. In a vehicle brake assembly of the type including a rotating drum, and a brake shoe, means providing a rigid pivotal support for the heel of the shoe and a member intermediate said pivotal support and the shoe, said member and shoe presenting relatively movable surfaces by which the shoe is permitted a sliding movement with respect to the member on a plane which if prolonged beyond the pivotal support will pass through the diametric line of the assembly including the pivotal support to that side of the diametric line remote from the shoe, whereby the shoe is permitted to move towards and away from the drum for the purpose of overcoming toe grab.

9. In a vehicle brake assembly of the type including a rotating drum and a brake shoe, means providing a rigid pivotal support for the heel of the shoe, and a member mounted for free rotation on the pivotal support and disposed intermediate the pivotal support and shoe, said member and shoe presenting relatively movable surfaces by which the shoe is held for sliding movement with respect to the member on predetermined lines to define a sliding movement of the shoe on a plane passing through the diametric line of the assembly and including the pivotal support to the remote side of the diametric line.

CECIL HAYES.
LESLIE CYRIL CHOUINGS.